United States Patent
Kuelker et al.

[11] Patent Number: 5,895,001
[45] Date of Patent: Apr. 20, 1999

[54] BALE SHREDDER

[75] Inventors: Clemens Kuelker; Paul Nadeau, both of Didsbury, Canada

[73] Assignee: Westward Products Ltd., Red Deer, AB, Canada

[21] Appl. No.: 08/858,394

[22] Filed: May 19, 1997

[30] Foreign Application Priority Data

Jun. 13, 1996 [CA] Canada ................................ 2179121

[51] Int. Cl.⁶ .................................................. B02C 19/12
[52] U.S. Cl. ........................... 241/101.76; 241/186.4; 241/605
[58] Field of Search ...................... 241/605, 186.4, 241/101.761, 101.76

[56] References Cited

U.S. PATENT DOCUMENTS

| | | | |
|---|---|---|---|
| 4,412,659 | 11/1983 | Crawford et al. | |
| 4,524,916 | 6/1985 | Keyes et al. | |
| 5,033,683 | 7/1991 | Taylor | 241/605 |
| 5,154,363 | 10/1992 | Eddy | |
| 5,340,040 | 8/1994 | Bussiere et al. | 241/605 |
| 5,573,190 | 11/1996 | Goossen | |
| 5,578,190 | 11/1996 | Rogers et al. | |
| 5,601,241 | 2/1997 | Brewster | 241/605 |
| 5,653,394 | 8/1997 | Bussiere et al. | |

FOREIGN PATENT DOCUMENTS 873968  10/1981  U.S.S.R. ................................ 241/605

*Primary Examiner*—Mark Rosenbaum
*Attorney, Agent, or Firm*—Murray E. Thrift; Adrian D. Battison

[57] ABSTRACT

A bale processor has a horizontal rotor mounted at the center of an upwardly concave bale support. The bale support rocks from side to side across the rotor to bring new parts of the bale against the rotor. The rocking action produces a rolling, sliding or tumbling motion that is suitable for round bales of any size, including old bales that have settled. The apparatus can also handle square bales and loose material.

12 Claims, 6 Drawing Sheets

BALE SHREDDER

FIELD OF THE INVENTION

The present invention relates to bale processors and more particularly to bale shredders.

BACKGROUND

Currently there are four basic concepts used for handling a bale during processing:

1. TRAVELING TABLE

With this design one or more chains travel over a generally horizontal table. The chains may have slats or spikes attached to them to engage in a bale being processed. The bale processing rotor is located at one end of the table. The table and rotor may be separated by generally vertical bars spaced such that rotor hammers are allowed to pass between the bars and come in contact with the bale being processed. Machines of this sort are designed to process round bales of varying diameters.

In the use of such a machine a bale is placed on the table and the chains travel in a direction to move the bale towards the rotor. The bale engages the vertical bars to limit its movement towards the rotor. Because the chains are continuously advancing, the bale is forced to roll, thus bringing new bale material to the rotor. As bale processing continues, the diameter of the bale is gradually reduced until the entire bale has been fed to the rotor.

Problems can occur with this type of unit when attempting to process old bales which have flattened out. These do not roll well and can cause problems of uneven feeding of the bale into the rotor. In some circumstances, the bale can get into a position in which the rotor hammers are no longer in contact with the bale and the chains are unable to engage the bale sufficiently well to rotate it to expose new material to the rotor. This type of processor can not process square bales, loose hay or other materials.

2. SUPPORT ROLLERS

This type of machine has two rollers mounted above and on opposite sides of the bale shredding rotor assembly. The rollers may have a number of spikes which engage a bale being processed. Between these rollers and the rotor are a number of curved bars arranged to allow rotor hammers to project through the bars into contact with the bale. The bars prevent too much material from coming into contact with the rotor.

To shred a bale with this type of unit, a bale is positioned on the two rollers. At least one of these rollers is driven to cause the bale to rotate. As the bale rotates, new material is brought into contact with the rotor hammers. As processing continues, the diameter of the bale is gradually reduced until the entire bale has been fed through the machine.

This type of machine also has problems with shredding bales that have gone out of round. In some cases the rollers are unable to rotate the bale, thus preventing the completion of the processing operation. Soft or loosely packed bales can also pose problems in that they tend to fall apart before they can be fully processed. This causes uneven feeding of material to the rotor. This type of machine can not process square bales, loose hay or other materials.

3. ROTATING TUB

The rotating tub machine is also designed to process only round bales. It consists of a loading mechanism that grasps the bale and rotates it onto a horizontal table. A portion of the table is open allowing the rotor hammers to come into contact with the bale.

In this type of machine, the bale is processed with its axis in the vertical orientation, unlike the other machines where the bale axis is horizontal. The loading mechanism also functions as the device that rotates the bale. The rotor hammers project above the plane of the table, thus coming into contact with the bale. As the bale tub rotates the bale on the table, new material is brought into contact with the rotor. As processing continues, the bale length is reduced until the entire bale has been fed through the rotor.

This machine is not as sensitive to the condition or shape of the bale being processed. However, very large bales or bales that are badly deformed can cause problems with loading and processing. Because the loading mechanism is also used to process the bale, it is not possible for a second bale to be carried while a bale is being processed as is the case with other machines. It is not possible to process square bales or loose materials with this machine.

4. OSCILLATING TUB

This type of machine is intended to be able to process round and square bales. It consists of a horizontal table positioned above the rotor assembly. There is an opening in the table which allows the hammers of the rotor to protrude above the plane of the table, thus contacting the bale. A series of horizontal bars are positioned across the opening to prevent too much material from contacting the rotor. An open bottom enclosure to house the bale rests on the surface of the table. With a bale loaded into the tub, the tub moves in a horizontal direction perpendicular to the rotor and pushes the bale across the opening in the table, thus exposing new material to the hammers of the rotor. Once the tub is moved to its limit of travel in one direction, it is reversed and the process is repeated.

Theoretically, this machine can process round bales of varying diameter as well as square bales and loose material. The machine should in theory not be susceptible to the condition of the material being processed. This is not found to be universally true.

The tub of this machine must be sized to accommodate the largest diameter of round bale likely to be encountered. In the case of old, deformed bales, this could be eight feet or more. When a smaller diameter bale is processed with such a machine, a problem of uneven feeding occurs. For example, if a five foot diameter bale is placed in an eight foot tub, a total of three feet of clearance exists between the walls of the tub and the bale. As the bale is processed, the tub moves to one side pushing the bale in that direction. When the tub reaches its limit of travel in that one direction, it reverses. There is, at this time, a three foot opening between the tub wall and the surface of the bale. This space must be closed in order for the bale to begin its movement in the opposite direction. During this time, very little new material is made available to the rotor hammers, thus causing uneven shredding of the bale. A similar problem occurs when attempting to process a square bale, as its cross-section is smaller than typical round bales.

Another problem has been noted with this type of machine. As the bale is moved across the opening in the table, part of the bale weight is supported by the horizontal bars located across the rotor opening. The rotor hammers are unable to remove the material immediately above the crossbars. With densely packed bales, the result is that channels are cut in those portions of the bale exposed to the hammers, while the portions immediately above the crossbars remain untouched. Once all of the material between the crossbars has been removed, no further shredding action occurs, as the entire bale weight is now supported by the crossbars. As the bale moves back and forth, it seems to return along the same path, thus not correcting the problem. This can result in a need to manually remove or reposition the bale in order to complete the shredding operation.

With this machine, the side to side motion used to process the bale results in significant shifts in the center of gravity of the unit. This can make the machine unstable when processing bales on uneven terrain. This can be rectified with a wide wheel track, but this in turn is disadvantageous in that it makes the machine more difficult to maneuver.

The present invention is concerned with a novel bale processing apparatus that mitigates the problems of the prior art.

SUMMARY

According to the present invention there is provided a bale processor comprising:

- a generally horizontal rotor;
- a plurality of bale openers secured to the rotor and projecting therefrom;
- upwardly concave bale support means above the rotor and comprising a plurality of spaced apart arcuate bale support members passing between bale openers;
- rotor drive means for rotating the rotor; and
- bale support rocking means for rocking the bale support means from side to side across the rotor as the bale openers pass between the arcuate bale support members.

The rocking motion of the bale support is used to expose new bale material to the rotor. This arrangement solves the problems experienced by other machines with respect to condition, size and shape of the bales being processed as well as providing the ability to process loose material.

The rocking motion of the bale support is used to bring new material into the path of the rotor. As the bale support rocks in one direction, the bale being processed moves with the bale support because of friction between the bale and the support members. Sufficient rotation is provided that the bale will eventually either slide or roll to a new position within the bale support. The abrupt change in direction when the bale support reaches its limit of travel also helps in shifting the bale's position.

This shifting in the bale position is important in solving the problem experienced with densely packed bales in some machines. If the rotor cuts channels in the bale, the shifting of the bale causes it to "fall off" the uncut material, thus exposing new material to the rotor. If the bale rolls instead of sliding, again new material is brought into the path of the rotor.

The shifting of the bale's position with respect to the bale support also results in a uniform shredding operation. There is no "dead time", when no shredding action occurs. The shifting of the bale's position results in a steady supply of material to the rotor.

Processing large square bales or badly flattened round bales is similar to the processing of round bales. The bales tend to slide when shifting position instead of rolling to a new position.

The rocking bale support is preferably contained within a stationary tub. The ends of the tub can be closed off to process loose material.

The bale support is preferably supported by two rollers on opposite sides of the rotor. Two hold-down flanges on opposite ends of the support then allow the support to rock about its center of rotation without a mechanical attachment at the center of rotation. The rollers preferably include flanges on opposite sides of each bale support bar to prevent the bars from coming into contact with the rotor hammers.

BRIEF DESCRIPTION OF THE DRAWINGS

In the accompanying drawings, which illustrate an exemplary embodiment of the present invention.

DETAILED DESCRIPTION

Figure 1:
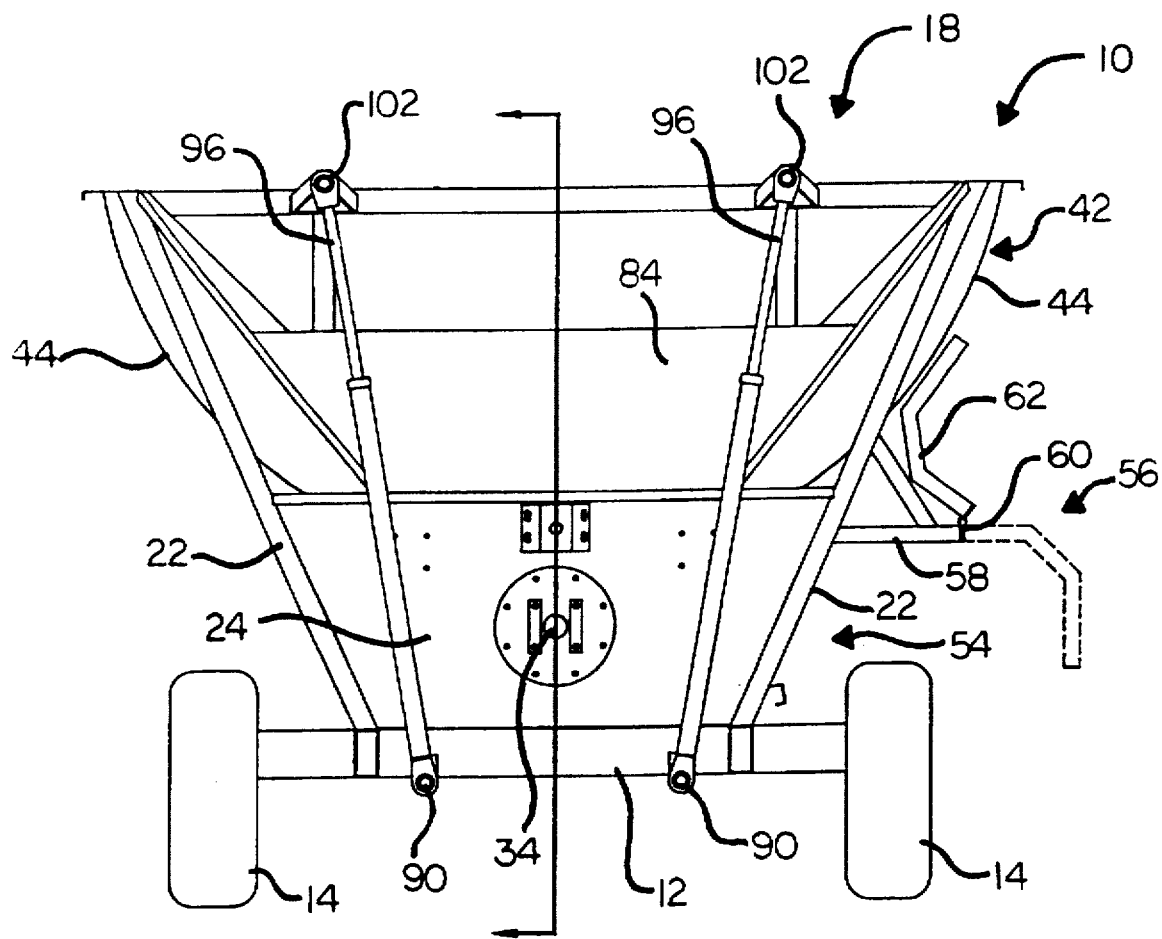
FIG. 1 is a front view of a bale processor according to the present invention.

Referring to the accompanying drawings, there is illustrated a bale processor 10 having a base frame 12 supported on two ground wheels 14 at the rear end of the frame. A tongue 16 projects from the front end of the frame for connection to a towing vehicle. The frame carries a processing unit 18 and a bale loader 20.

Figure 2:
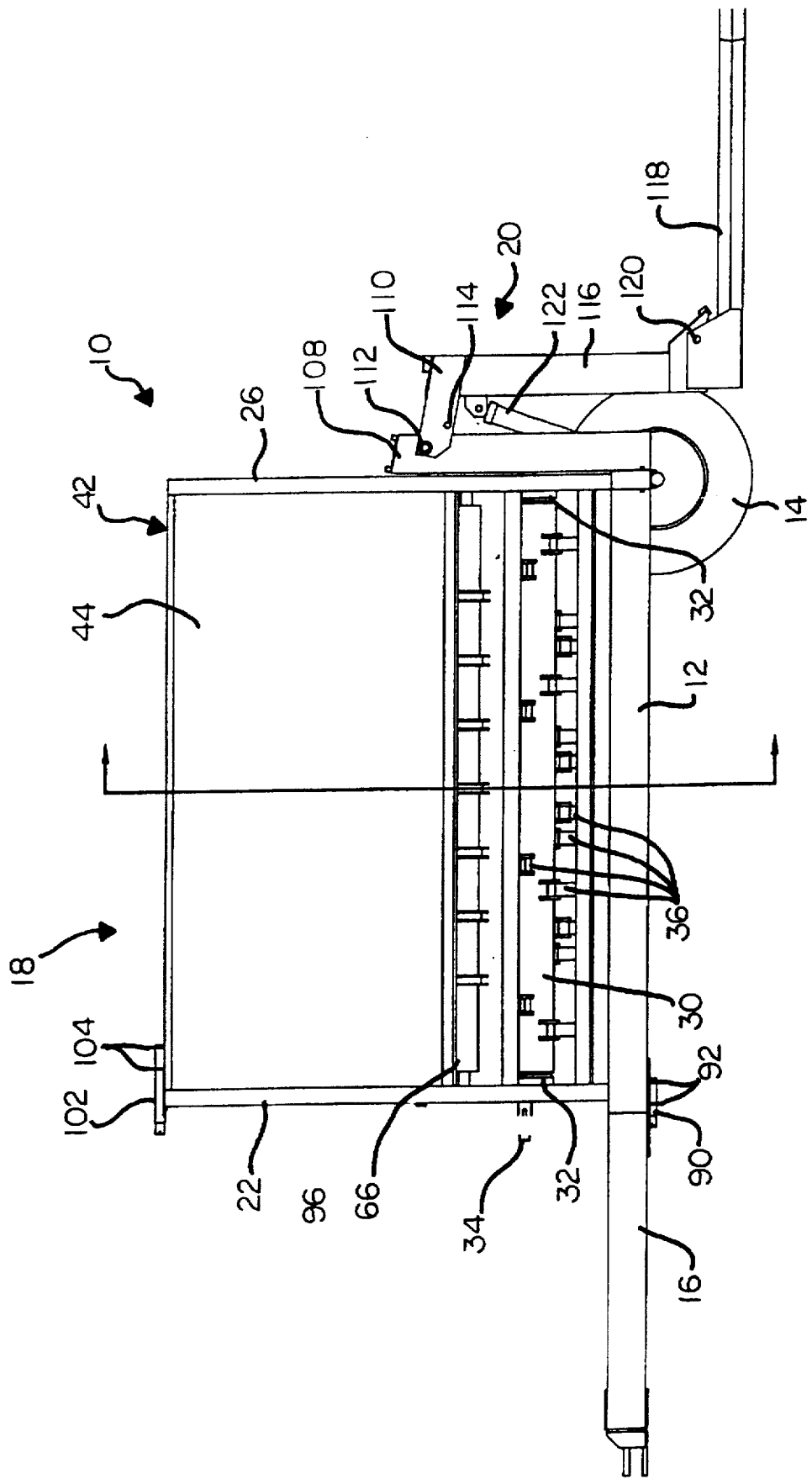
FIG. 2 is a side view of the processor.
Figure 4:
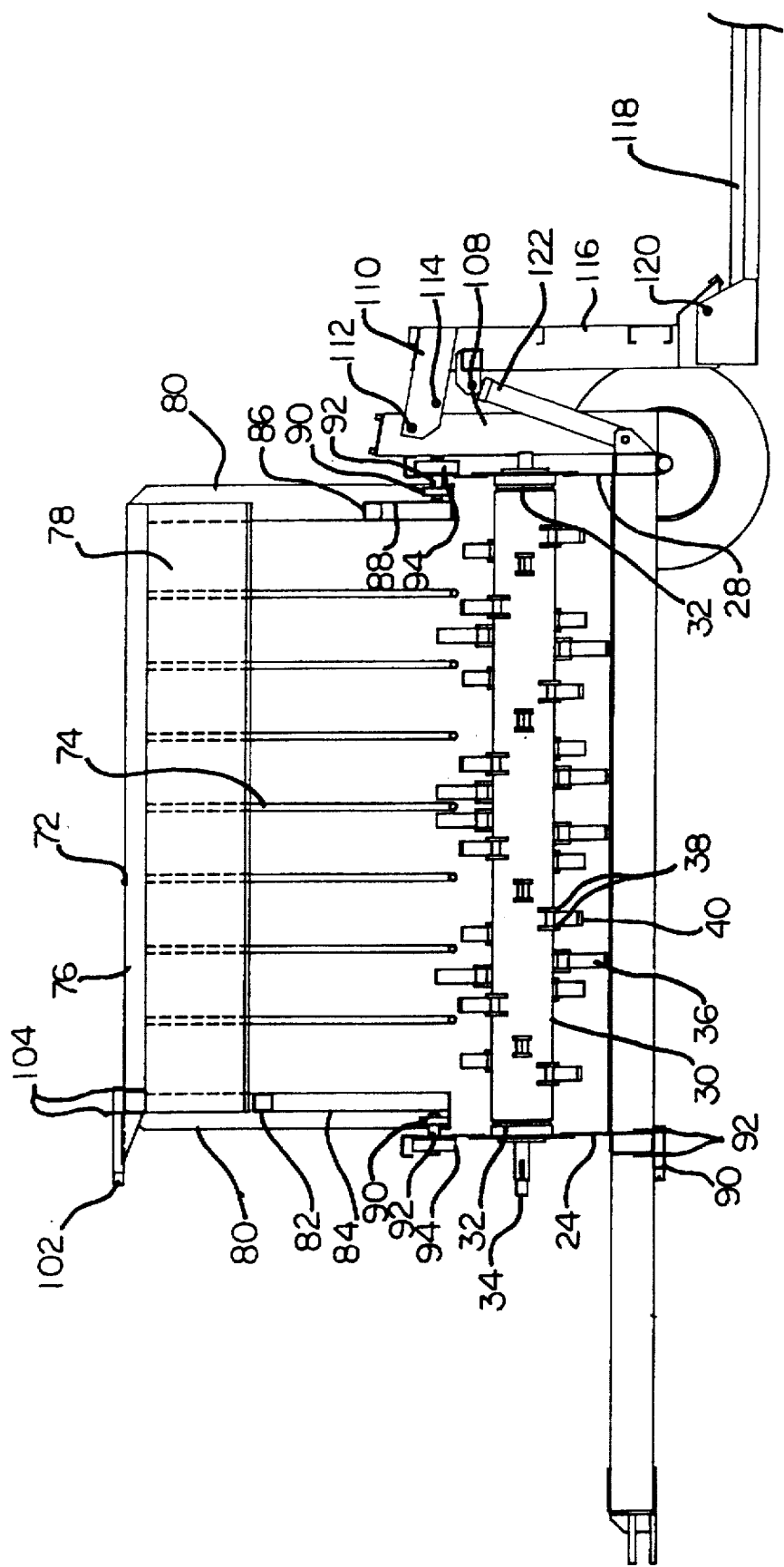
FIG. 4 is a section along line 4—4 of FIG. 1.
Figure 5:
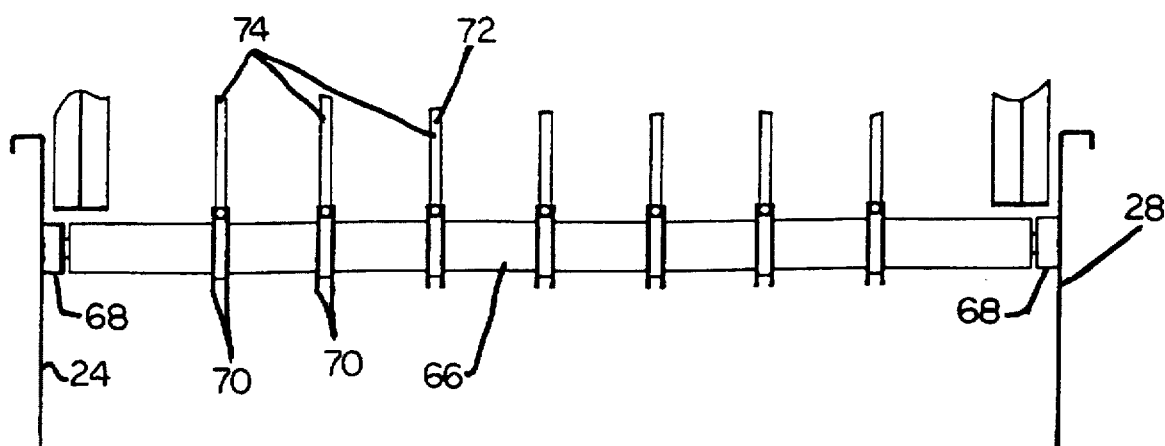
FIG. 5 is a view along line 5—5 of FIG. 3.
Figure 6:
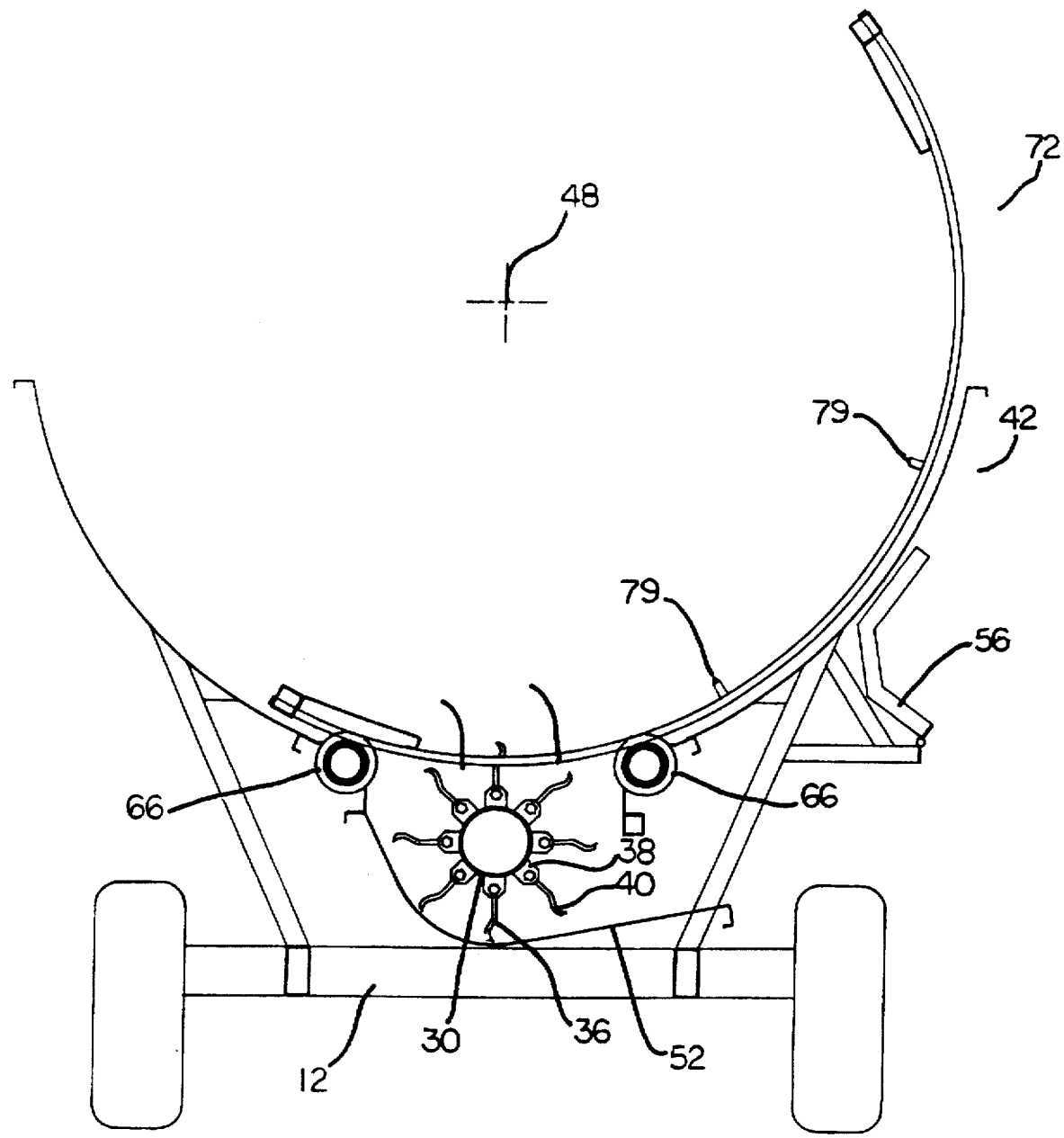
FIG. 6 is a view like FIG. 3 showing the rotation of the bale support.

At the front of the processor, immediately behind the tongue are two upwardly and outwardly angled support members 22. These support a trapezoidal front panel 24 extending upwardly from the frame at the front of the processor. A similar pair of support members 26 (FIG. 2) and a back panel 28 (FIG. 4) are found at the rear of the processing unit.

Extending along the processing unit, at the bottom, just above the frame 12 is a rotor 30. This is mounted in bearings 32 supported on the front and back panels 24 and 28. A drive shaft 34 for the rotor projects forwardly from the front panel 24 for connection to a power takeoff from a towing vehicle. The rotor carries a number of bale opening hammers 36 for shredding bale material. These are distributed uniformly over the surface of the rotor. Each consists of two flanges 38 projecting from the rotor surface and a blade 40 pivotally mounted on the two flanges by an appropriate cross-shaft parallel to the rotor axis.

The support members 22 and 26 support a stationary tub 42. This includes two side panels 44 that extend upwardly and outwardly from opposite sides of the rotor 30. The panels have a part-cylindrical configuration with a center of curvature 48 positioned above the rotor 30.

Between the two side panels, and above the rotor, is a discharge opening 50 that extends the length of the processor unit. Below the rotor is a curved shroud 52 that extends from one of the side panels, under the rotor and to the opposite side of the processor. This provides a side discharge opening 54. A deflector 56 is mounted on the apparatus above the side discharge opening. This includes a fixed panel 58 extending laterally from the processor. A hinge 60 along the outer edge of the fixed panel 58 mounts a concave deflector panel 62 that will pivot from the stored position shown in solid line in FIG. 1 to the broken line position shown in that same figure. When in the broken line position, the deflector will act to deflect down onto the ground processed bale material being ejected from the side discharge of the apparatus.

Mounted on the processor on opposite sides of the rotor 30 are two rollers 66. Each of these is supported in two bearings 68 mounted on the front and back panels 24 and 28 respectively. Each of these rollers carries a series of pairs of annular flanges 70 that are aligned with spaces between adjacent rotor hammers 36. These rollers serve to support an upwardly concave bale support 72 formed from a series of arcuate bars 74. The curvature of the bars is circular, centered on the centre of curvature 48. Each of the bars is supported on the two rollers between respective pairs of the flanges 70. The bars thus pass between the hammers 36 of the rotor 30. Along each side of the bale support, the bars 74 are connected by a side beam 76. Extending along the bars on the inside of each side beam 76 is a short panel 78. Two inwardly projecting pins 79 are mounted on the inside of each of the bars 74, on either side of the centre of the bar.

At each end of the bale support are arcuate bands 80 having the same curvature as the bars 74. The band 80 at the front of the processor carries a cross member 82 which supports an end panel 84. At the back end, the band 80 carries a cross member 86 that is positioned lower than the cross member 82 at the front in order to provide clearance for the loading of bales into the bale support. A short panel 88 extends between the cross member 86 and the band 80. The bands 80 project outwardly beyond the respective cross members and panels for engagement under respective hold-down rollers 90 mounted on the front and back of the apparatus. The hold-down rollers 90 are mounted on respective shafts 92 supported in bearings 94 mounted on the front and back panels 24 and 28.

At the front of the processor are two hydraulic cylinders 96. Each is connected to a pin 90 mounted on the bottom of the frame 12 by a pair of lugs 100. The cylinders extend upwardly to respective pins 102 mounted by lugs 104 on a top cross member 106 extending across the bale support 72 at the front. The cylinders are mounted on opposite sides of the center of the bale support so that extension of one cylinder an the other will rock the bale support to one side or the other, across the rotor 30.

At the back of the processor, the bale loader 20 includes an upright mast 108 mounted on the frame. An arm 110 is mounted on the mast by a lateral pivot 112. A stop pin 114 on the arm limits downward movement of the arm to the position illustrated in FIG. 4. The arm 110 is connected to the top end of a vertical fork arm 116 that carries a bale lifting fork 118 at its opposite end. The bale fork is mounted on the fork arm 116 by a pivot 120 so that it can be lifted to an upright position for transport purposes. A cylinder 122 extends from the frame 12 to the fork arm 118 and, when extended, pivots the fork upwardly to deposit a bale carried by the fork in the bale support.

Figure 3:
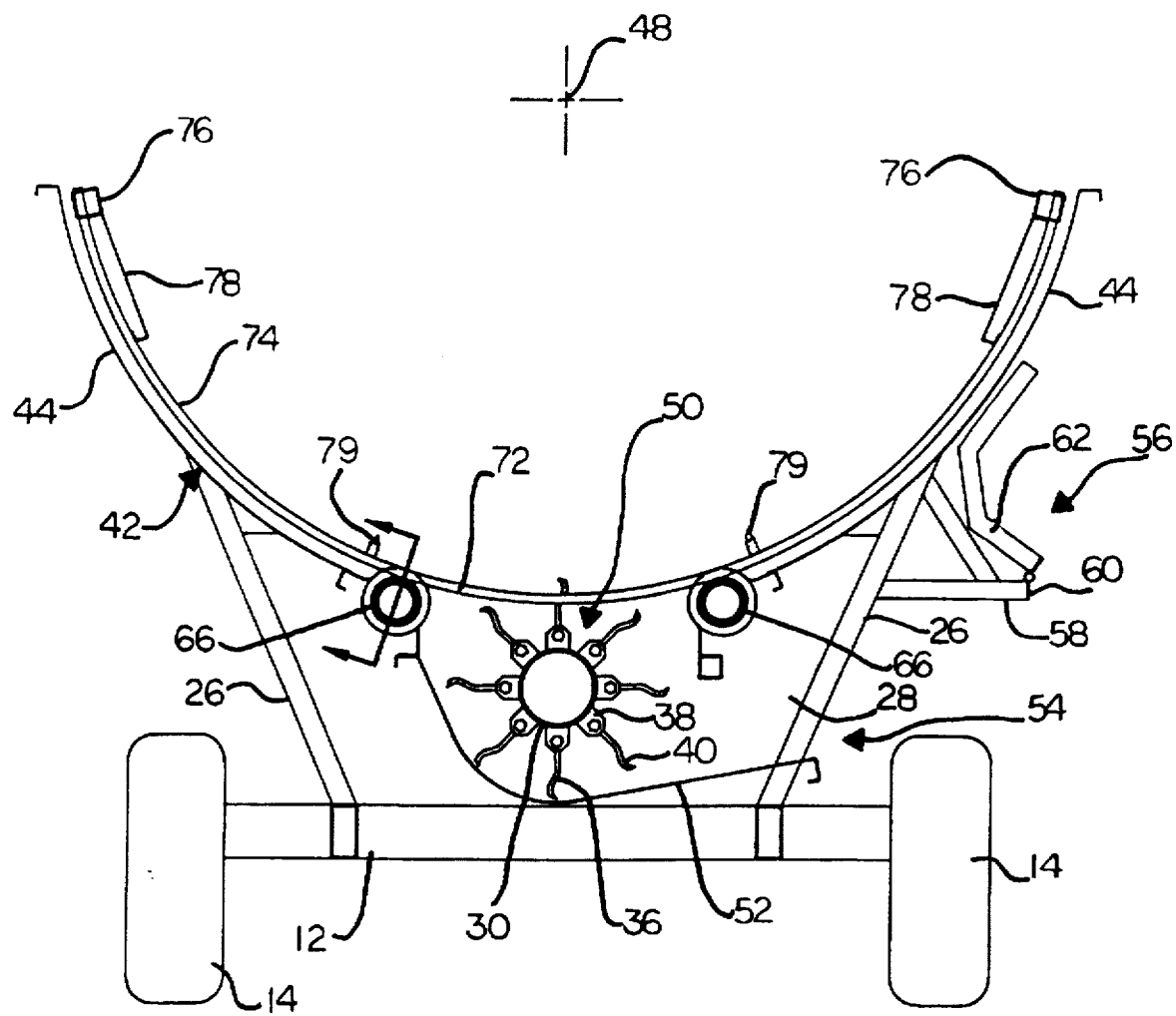
FIG. 3 is a view along line 3—3 of FIG. 2.

In use of the apparatus, the rotor is driven anti-clockwise as seen in FIG. 3 and shreds material from the exposed surface of a bale supported on the bale support. The bale support cylinders 96 are alternately actuated to rock the bale support back and forth across the rotor 30. This will cause the bale to roll, slide or tumble, exposing new parts of the bale to the rotor for shredding. Bales of any size and shape that will fit into the bale support can be processed. With end walls on the outer tub, loose material can be processed as well. The pins 79 provide a grip on bales that are sufficiently wet or otherwise slippery that they will slide on the bars 74 rather than rolling or tumbling.

While one embodiment of the present invention has been described in the foregoing, it is to be understood that other embodiments are possible within the scope of the invention. The invention is to be considered limited solely by the scope of the appended claims.

We claim:

1. A bale processor comprising:
   a generally horizontal rotor;
   a plurality of bale openers secured to the rotor and projecting therefrom;
   upwardly concave bale support means comprising a plurality of upwardly concave arcuate bale support members spaced apart along the rotor and positioned above the rotor with the bale support members positioned between adjacent bale openers;
   bale support mounting means mounting the bale support means for rocking movement of the arcuate bale support members from side to side across the rotor;
   rotor drive means for rotating the rotor; and
   bale support rocking means for rocking the arcuate bale support members from side to side across the rotor as the bale openers pass between the arcuate bale support members.

2. A bale processor according to claim 1 wherein the arcuate members have a circular curve.

3. A bale processor according to claim 2 wherein the circular curve has a center positioned above the rotor.

4. A bale processor according to claim 3 wherein the rocking means comprise means for rotating the bale support means about the center of the arcuate members.

5. A bale processor according to claim 1 including a tub extending along the rotor and at least partially enclosing opposite sides of the arcuate bale support members.

6. A bale processor according to claim 5 wherein the tub includes end walls closing opposite ends of the tub.

7. A bale processor according to claim 1 including a pair of elongate support rollers extending along opposite sides of the rotor and supporting the bale support members.

8. A bale processor according to claim 7 including pairs of circumferential flanges on each roller with the flanges of each pair engaging opposite sides of a respective one of the arcuate bale support members.

9. A bale processor according to claim 1 including delivery means comprising a shroud below the rotor and a discharge opening at one side of the shroud.

10. A bale processor according to claim 5 wherein the rocking means comprise at least one hydraulic cylinder extending between the bale support means and the tub.

11. A bale processor according to claim 1 comprising a wheel supported base.

12. A bale processor according to claim 11 including bale loading means for loading bales onto the bale support means.

* * * * *